United States Patent [19]

Shulke

[11] 4,186,930
[45] Feb. 5, 1980

[54] VIBRATION AND DUST ISOLATION SYSTEM

[75] Inventor: David D. Shulke, Decatur, Ill.

[73] Assignee: Caterpillar Tractor Co., Peoria, Ill.

[21] Appl. No.: 961,151

[22] Filed: Nov. 3, 1978

[51] Int. Cl.² .................. B62D 27/04; F16J 15/10
[52] U.S. Cl. .................. 277/166; 277/199; 277/207 R; 248/634; 296/35.1
[58] Field of Search .......... 277/192, 199, 166, 207 R, 277/211, 214, 215, 228, 235 B; 248/634; 296/35 R

[56] References Cited

U.S. PATENT DOCUMENTS

| | | | |
|---|---|---|---|
| 1,986,465 | 1/1935 | Dempsey | 277/199 |
| 3,175,832 | 3/1965 | Carrell | 277/199 |
| 3,231,289 | 1/1966 | Carrell | 277/166 X |
| 3,738,670 | 6/1973 | Jelinek et al. | 277/166 X |
| 3,866,926 | 2/1975 | Traum | 277/166 |
| 3,892,417 | 7/1975 | Clayton | 277/207 R |
| 3,990,737 | 11/1976 | Palmer | 296/35 R |
| 4,066,058 | 1/1978 | Anderkay | 296/35 R X |
| 4,067,531 | 1/1978 | Sikula | 277/211 X |

FOREIGN PATENT DOCUMENTS

| | | | |
|---|---|---|---|
| 129938 | 11/1948 | Australia | 248/634 |
| 810728 | 1/1937 | France | 277/235 B |

Primary Examiner—Robert S. Ward, Jr.
Attorney, Agent, or Firm—Wegner, Stellman, McCord, Wiles & Wood

[57] ABSTRACT

A vibration and dust isolation system for use in isolating first and second spaced elements (20,22) which together form at least a part of the structure (14) to be sealed. A resilient strip (30) is interposed between the elements and a fastener (26) secures the elements in sandwiching relation to the strip. The improved strip is generally planar with a considerable majority (40) of the strip having a first thickness less than the spacing between the first and second element, an edge (42,56) having a second thickness somewhat greater than the spacing, and a load bearing portion (38) having a thickness somewhat greater than the spacing and comprising a considerable minority of the total surface of the strip. The load bearing portion is the predominant part of the strip contacting both elements.

9 Claims, 5 Drawing Figures

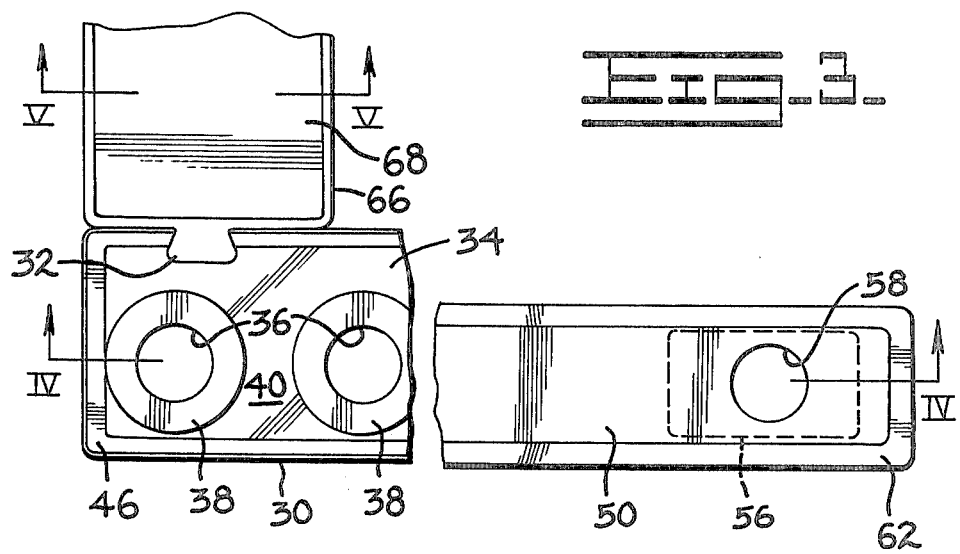
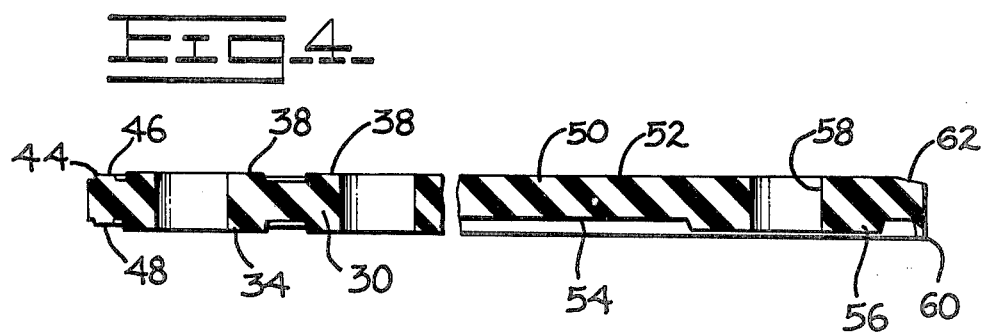

VIBRATION AND DUST ISOLATION SYSTEM

TECHNICAL FIELD

This invention relates to a vibration and dust isolation system as may be used in connection with two spaced elements whose interface is to be sealed by a resilient strip such that vibration transmission between the elements is minimized.

BACKGROUND ART

Prior art of possible relevance includes the following U.S. Pat. Nos. 4,066,058 issued Jan. 3, 1978 to Anderkay; 4,067,531 issued Jan. 10, 1978 to Sikula; 3,738,670 issued June 12, 1973 to Jelinek et al; 3,990,737 issued Nov. 9, 1976 to Palmer; and 3,319,918 issued May 16, 1967 to Rapata.

There are many diverse types of apparatus in use today wherein components are subject to vibration and wherein it is desired to prevent or otherwise minimize transmission of such vibration from one component to another and, at the same time, seal the interface of the components. A very typical example of such an apparatus is a vehicle. In many cases, the operator cab for a vehicle is formed of sheet metal secured to the vehicle frame which also mounts the vehicle prime mover. Vibrations imparted to the vehicle frame by the prime mover and/or the underlying terrain over which the vehicle may be traveling can be transmitted to the cab causing the panels thereof to vibrate. The resulting vibration and noise level within the cab is quite severe and will contribute substantially to operator fatigue. Thus, it is highly desirable to prevent such vibrations from being transmitted to the cab panels so that the operator may operate the vehicle in a relatively quiet and vibration free environment.

At the same time, particularly in the case of construction vehicles, dust in the environment may be voluminous and it is desired to prevent the entry of such dust or other foreign material into the interior of the cab.

All of the foregoing patents, with the exception of the Rapata patent, relate to typical uses of vibration and dust isolation systems and it will be appreciated that generally, the resilient strip utilized must, in addition to providing sealing and vibration isolation, be a load bearing element, frequently supporting the weight of a cab or the like. As a consequence of being loaded, the resilient strip becomes less effective as a vibration isolation device.

DISCLOSURE OF THE INVENTION

In one aspect of the present invention, there is provided for use in a vibration and dust isolation system of the type including first and second spaced elements, at least one of which is capable of undergoing undesirable vibration and which together form at least part of a structure to be sealed, a resilient strip interposed between the first and second elements, and a fastener securing the elements in sandwiching relation to the strip such that the strip seals the interface between the elements and impedes the transmission of vibration across the interface, and an improved sealing strip. The strip is generally planar with a considerable majority of the strip having a first thickness less than the spacing between the first and second elements when the strip is installed therebetween. The strip further includes an elongated edge having a second thickness somewhat greater than the spacing so as to engage the first and second elements when installed and seal against the elements. The strip further includes a load bearing portion comprising the remainder of the strip and of a thickness somewhat greater than that of the spacing. The load bearing portion is the predominant part of the strip contacting both of the elements while constituting a considerable minority of the surface area of the strip.

As a consequence, such vibration as may be transmitted due to the fact that the resilient strip is load bearing can be transmitted only across the relatively small amount of the surface of the strip that constitutes the load bearing portion. Therefore, undesirable vibration transmission through the resilient strip is held to a minimum while the strip still provides for good sealing between the elements.

DESCRIPTION OF THE DRAWINGS

FIG. 3 is an enlarged, fragmentary, plan view of a resilient strip in a relaxed condition;

FIG. 4 is a further enlarged fragmentary vertical section taken approximately along the line 4—4 in FIG. 3;

FIG. 5 is a further enlarged vertical section taken approximately along the line 5—5 in FIG. 3.

BEST MODE FOR CARRYING OUT THE INVENTION

Figure 1:
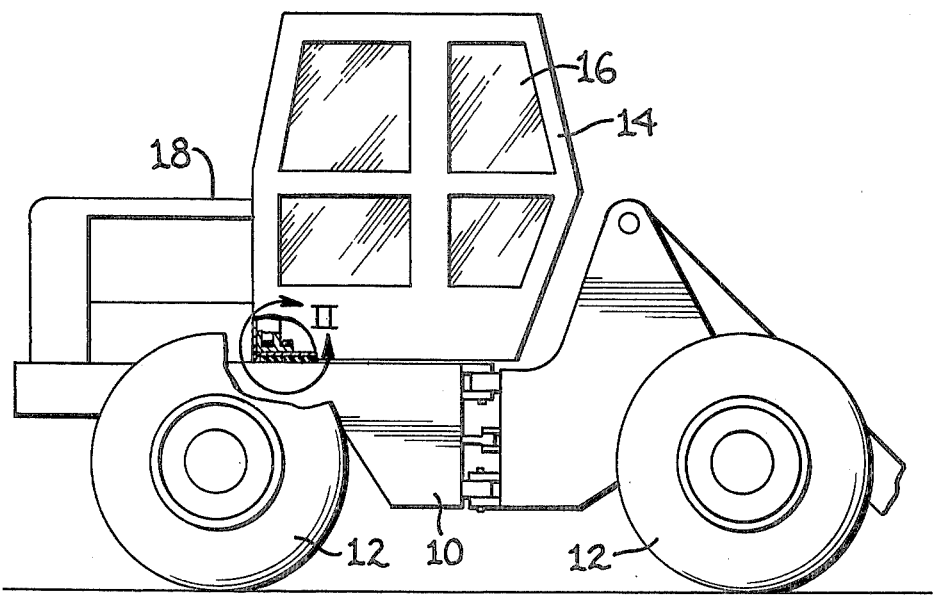
FIG. 1 is a somewhat schematic side elevation of an apparatus in which an embodiment of a vibration and dust isolation system made according to the invention can be used; the apparatus being in the form of an articulated vehicle.

An exemplary embodiment of a vibration and dust isolation system made according to the invention is illustrated in the drawings and, in FIG. 1, is shown in the environment of a vehicle. However, it is to be understood that the invention is not limited to such uses and can be used with efficacy in other environments wherever both vibration and dust isolation are required, particularly where a resilient strip utilized for the purpose is also subjected to mechanical loading.

With reference to FIG. 1, there is illustrated a vehicle having a frame 10 supported above the underlying terrain by wheels 12. The frame 10 mounts an operator cab 14 which typically will be formed of sheet metal or the like and may include glass panels 16 as well as sheet metal panels (not shown) which undergo undesirable vibration.

The vibration may be imparted to the vehicle either by unevenness of the underlying terrain over which the vehicle is traveling, changes in loading upon the vehicle while it is performing work, the operation of a prime mover such as an engine housed in engine compartment 18, etc. In any event, it will be appreciated that such vibration will be first applied to the frame 10 which then can possibly transmit it to the cab 14. As alluded to previously, vibration in the operator area defined by the cab 14 is undesirable as is the entry there into of foreign material as, for example, dust that might be generated during operation of the vehicle.

Figure 2:
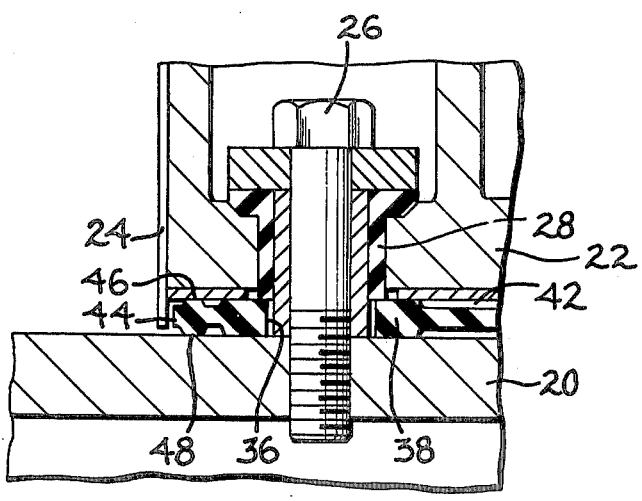
FIG. 2 is an enlarged, fragmentary section taken approximately along the line 2—2 of FIG. 1.

As seen in FIG. 2, the frame 10 will typically include a metallic frame member 20. The cab 14 will include metallic frame members 22 which mount sheet metal panels 24 as well as the glass 16 (FIG. 1). A fastener in the form of a bolt 26 secures the frame members 20 and 22 to each other to assemble the cab 14 to the frame 10. The fastening of the frame members 20 and 22 together by the bolt 26 is indirect in that a resilient grommet 28, which may be regarded as conventional for the purposes of the present invention, is interposed between one of the elements, namely the element 22, and the fastener 26.

To avoid metal to metal contact between the frame members 20 and 22 which would facilitate the transmission of vibration and which might not provide as adequate of a seal as might be desired, a resilient strip 30 is interposed between the two. The resilient strip 30 both seals the interface of the frame members 20 and 22 and resists the transmission of vibrations across such interface.

Turning now to FIG. 3, the resilient strip 30, may in fact, be made up of several such strips extending about the entire periphery of the underside of the cab 14 and connected to each other by dovetail connections 32. One section 34 of the strip 30 will now be described with reference to FIGS. 3 and 4. As seen in FIG. 4, the strip 34 is generally planar and is provided with apertures 36 (see also FIG. 2) through which the fastener 26 and the grommet construction 28 may extend in fastening the frame members 20 and 22 together. The apertures 36 are located in load bearing portions 38 of the section 34. The thickness of the section 34 at the load bearing portion 38 is slightly greater than the spacing between the facing sides of the cab 14 and frame 10 when the strip 30 is installed. In the usual case, the thickness may be on the order of about 10% so that approximately a 10% compression of the load bearing portions 38 will result when the strip is installed.

A considerable majority of the section 34, shown at 40 in FIG. 4, and constituting substantially all of the remainder of section 34 other than the load bearing portions 38 as seen in FIG. 3 is also provided and has a thickness less than the spacing between the frame members 20 and 22 when installed so that as seen in FIG. 2, spaces 42 result. Thus, over the part 40 of the section 34, there will be no contact between the section 34 and the frame members.

The thickness of the section 34 of the strip 30 about the edge 44 of the section 34 is of intermediate thickness. That is, the edge 44 has a thickness greater than the majority 40 of the section 34 and slightly less than that of the load bearing portions 38. The precise thickness chosen for the edge 44 will be dependant upon the degree of compression to which the load bearing portions 38 are subject, the thickness being chosen so that opposing sides 46 and 48 of the edge 44 sealingly contact respective ones of the frame members 20 and 22 as shown in FIG. 2 to sealingly engage the same. The thickness of the edge 44 will further be such that when such contact is made, there will be very little compression of the edge 44 so that the same acts substantially only as a seal and not as a load bearing part of the strip 30.

As can be seen from the drawings, the sides 46 and 48 of the edge 44 are relatively narrow so that the total surface area of contact of the edge 44 by the frame members 20 and 22 is very small, particularly in relation to the size of the load bearing portions 38 which preferably are circular as illustrated. Consequently, the load bearing portions 38 are the predominant part of the section 34 of the strip 30 contacting both of the frame elements 30 and 32 while constituting a considerable minority of the surface area of the strip. Thus, because the vast majority of the surface area of the section 34 of the strip 30 is spaced from the frame members by the spaces 42, and the edge 44 is not appreciably compressed when installed, the only surface path for vibration transmission is through the load bearing portions 38 which are small in relation to the entire structure. Therefore, the size of the vibration transmission path is minimal with a comensurate minimization in the amount of vibration transmitted.

The strip 30 may include an additional section 50 connected to the section 34 by a dovetail connection similar to that shown at 32 but not illustrated in FIGS. 3-5. The section 50 includes an upper planar surface 52 which will normally be in contact with the upper frame member 22 when installed. The lower surface 54 of the portion 50 includes a rectangular boss 56 having an aperture 58 provided for the same purpose as the apertures 36 in the section 34. The boss 56 serves as a second load bearing portion similar in function to the load bearing portions 38 and has essentially the same thickness. Its thickness is greater than that of the vast majority of the remainder of the section 50 as can be seen in FIG. 4. The thickness is such that when installed, the boss 56 will be compressed to the desired extent, usually 10%, and when so compressed, the under surface 54 of the section 50 will be spaced above the frame member 20 and out of contact therewith.

For sealing purposes, the periphery of the section 50 is provided with a peripheral lip 60. The lip 60 extends downwardly and at the lip 60 the effective thickness of the section 50 is greater than that of the boss 56. A bevel 62 above the edge of the section 50 on the upper surface 52 thereof is provided. Consequently, when installed and compressed to the desired degree, the presence of the bevel 62 will cause the edge 60 to deflect outwardly and in sealing contact with the frame member 20. Because the lip 60 deflects, compression therein is minimized and vibration transmission through the lip is also minimized.

As with the section 34, the section 50 provides a vibration transmission path substantially only through the boss 56 which constitutes a considerable minority of the surface area of the section 50 while being the predominant part thereof in contact with both the frame members 20 and 22. Contact by the lip 60 is minimized because of its narrow width and vibration will not transmit therethrough readily by reason of its deflected condition when installed.

FIG. 5 illustrates a further section 66 of the strip 30 which does not include a load bearing portion. The upper surface 68 of the section 66 is generally planar and the lower surface 70 is surrounded by a peripheral groove 72 which in turn is surrounded by a down turned, outwardly tapered lip 74 defining the edge of the section 66.

The thickness between the surfaces 68 and 70 is less than the spacing between the frame members 20 and 22 when the section 66 is installed so that only the surface 68 will contact the frame member, namely the frame member 22. The surface 70 will be spaced from the frame member 20. The taper of the lip 74 causes the same to deflect outwardly when installed, the thickness of the section 66 thereat being such that the lip 74 will contact the lower frame member 20. The groove 72 assists in insuring an outward deflection of the lip 74. Again, because the lip 74 deflects, as opposed to compresses, when installed, only minimal vibration transmission can occur thereat.

INDUSTRIAL APPLICABILITY

In use, the strip 30 consisting of the section 34, 50 and 66, and possibly other like sections as well, will be disposed appropriately on the frame member 20 with the lips 60 and 74 directed downwardly. The sections will be secured together through the dovetail connection 32 and the apertures 36 and 58 aligned with the fastener receiving locations in the frame members 20 and 22. The cab 14 may then be disposed in place on the strip with fasteners 26 inserted through grommets 28 to compress the load bearing portions 38 and 56 to the desired degree as mentioned previously.

The lips 60 and 74 will deflect to seal against the lower frame member 20 while the upper surfaces 52 and 68 the corresponding sections 50 and 66, of course, sealingly engage the upper frame member 22. The opposing sides 46 and 48 of the edge 44 of the section 30 will touch corresponding frame members 20 and 22 without being appreciably compressed.

As a consequence, the vast majority of contact with the strip 30 by both frame members 20 and 22 will occur only at the load bearing portions 38 and 56 the edge 44 being subject only to minimal compression and the lips 60 and 74 deflecting rather than compressing. Thus, a considerable majority of the total surface area of the strip 30 will not be in contact with both frame members 20 and 22 reducing the cross section of the vibration transmission path and thereby greatly reducing the amount of vibration transmitted.

At the same time, sealing at the edge 44 and the lips 60 and 74 will be provided. Thus, vibration transmission to the cab 14 is greatly reduced and yet, the interior thereof is sealed from dust, noise and the like.

The invention also permits the use of harder elastomers having long life and good wear resistance in forming the strip than could otherwise be used and still achieve desirable vibration isolation. Consequently, the strip of the invention provides excellent vibration isolation and sealing and has an extended trouble-free life.

What is claimed is:

1. In a vibration and sealing isolation system of the type including first and second, spaced elements (20,22) at least one of which is capable of undergoing undesirable vibration, and which together form at least part of a structure (14) to be sealed, a resilient strip (30) interposed between said first and second elements, and a fastener (26) securing said elements in sandwiching relation to the strip such that the strip seals the interface between the elements and impedes the transmission of vibration across said interface, the improvement wherein said strip is generally planar with a considerable majority (40) of the strip having a first thickness less than the spacing between said first and second elements when said strip is installed therebetween, the strip further including an elongated edge (44,60) having a second thickness somewhat greater than said spacing so as to deflect when installed and seal against one of said elements, and a load bearing portion (38,56) comprising the remainder of the strip and of a thickness somewhat greater than said spacing, said load bearing portion being the predominant part of the strip contacting both said elements while constituting a considerable minority of the surface area of the strip.

2. The vibration and sealing isolation system of claim 1 wherein said fastener extends through an aperture (36,58) in said strip, said aperture being located in said load bearing portion.

3. The vibration and sealing isolation system of claim 2 wherein said edge is defined by a relief (62) on one face (52) of said strip and a lip (60) on the opposite face (54).

4. The vibration and sealing isolation system of claim 3 wherein said relief is a bevel (62) on said one face, the remainder of said one face (54) being planar.

5. The vibration and sealing isolation system of claim 4 wherein said edge extends about substantially the entire periphery of said strip.

6. The vibration and sealing isolation system of claim 1 wherein at least part of said edge is defined by a lip having an outward taper (44,58).

7. The vibration and sealing isolation system of claim 1 wherein said load bearing portion (56) has a thickness less than the effective thickness of said edge (60).

8. The vibration and sealing isolation system of claim 1 wherein said load bearing portion (38) has a thickness greater than that of said edge (44).

9. The vibration and sealing isolation system of claim 1 wherein said strip is formed of a plurality of interconnected sections (34,50,66), at least one of which (34,50) is provided with said load bearing portion (38,56).

* * * * *